E. SCHUBERT.
BEATER.
APPLICATION FILED MAR. 29, 1916.

1,237,707.

Patented Aug. 21, 1917.
2 SHEETS—SHEET 2.

Witnesses:
C. E. Wessels
B. J. Richards

Inventor:
Edward Schubert,
By Joshua R. H. Potts
his Attorney.

UNITED STATES PATENT OFFICE.

EDWARD SCHUBERT, OF CHICAGO, ILLINOIS, ASSIGNOR OF ONE-HALF TO OTTO W. ULLRICH, OF CHICAGO, ILLINOIS.

BEATER.

1,237,707.　　　　　Specification of Letters Patent.　　Patented Aug. 21, 1917.

Application filed March 29, 1916. Serial No. 87,584.

*To all whom it may concern:*

Be it known that I, EDWARD SCHUBERT, a citizen of the United States, and a resident of the city of Chicago, county of Cook, and State of Illinois, have invented certain new and useful Improvements in Beaters, of which the following is a specification.

My invention relates to improvements in beaters, especially adapted for beating eggs, creams, and the like, the objects of the invention being to provide an improved construction of this character, which is simple and efficient in use.

The invention consists in the combinations and arrangements of parts hereinafter described and claimed.

Figure 1:
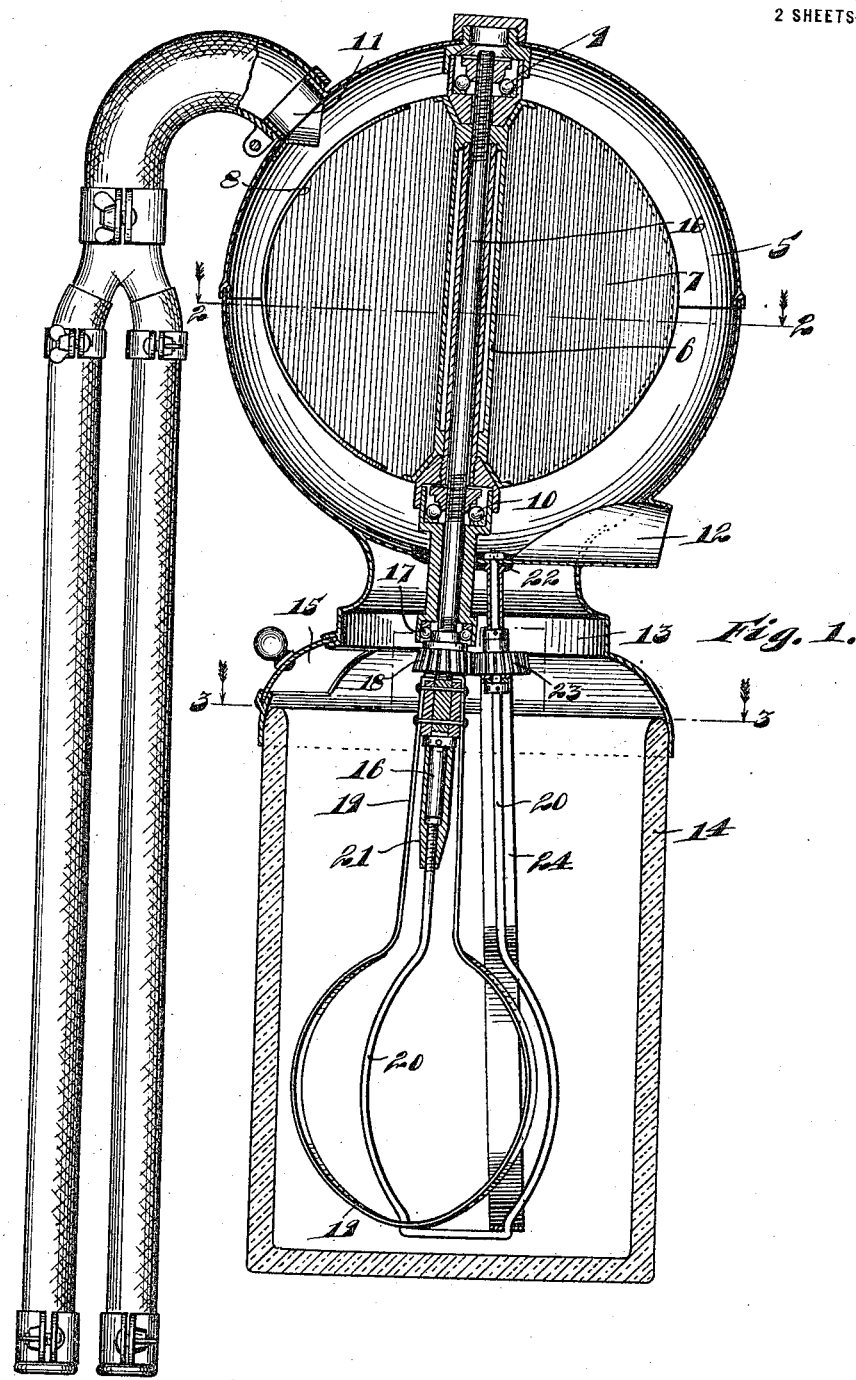
Figure 2:
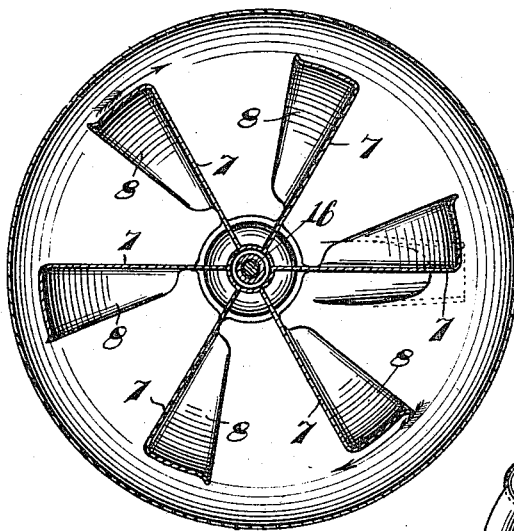
Figure 4:
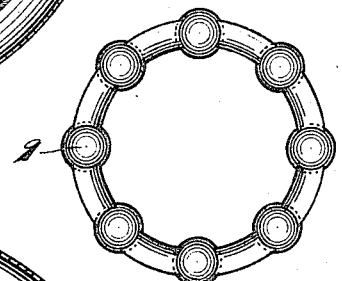
Figure 3:
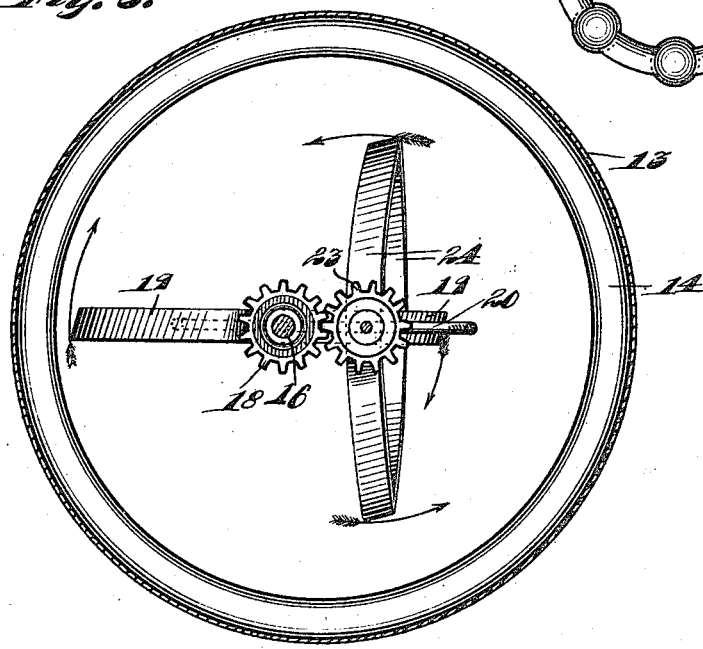

The invention will be best understood by reference to the accompanying drawings forming a part of this specification, and in which, Figure 1 is a sectional view of a beater embodying my invention, Fig. 2, a section taken on line 2—2 of Fig. 1, Fig. 3, an enlarged section taken on line 3—3 of Fig. 1, and Fig. 4, a detail view of a ball bearing employed in the construction.

The preferred form of construction as illustrated in the drawings, comprises a spherical casing 5 having a water wheel arranged therein. The water wheel is provided with a central spindle 6 and radiating blades 7 having backwardly turned flanges 8 about their outward portions. The spindle 6 is mounted at the top and bottom respectively on ball bearings 9 and 10. A tangential inlet 11 is provided on one side of the upper portion of the casing 5. A water outlet 12 is provided at the opposite side of casing 5 at the bottom thereof to permit of the escape of water from said casing. Casing 5 is provided with a depending base 13 shaped to fit over and rest on the upper edge of a suitable receptacle 14 for containing the material to be beaten. A slip door 15 is provided for base 13 to give access to vessel 14. By this arrangement it will be observed that the device will be readily mounted and supported on the top of a suitable vessel, and that the water wheel in casing 5 may be rotated by passing water under pressure through said casing.

The water wheel carries a depending shaft 16 having a ball bearing 17 in the base 13 and a beveled gear is fixed thereto immediately below said ball bearing. A beating element 19 is secured to shaft 16 below gear 18 as indicated. A substantially U-shaped frame member 20 carries at one end a socket member 21 loosely fitting over the lower end of shaft 16 and secured at its other end 22 to the bottom of casing 5. A beveled gear 23 is loosely mounted on frame 20 meshing with gear 18 and carrying another beating element 24 coöperating with beating element 19. By this arrangement, it will be observed, that upon rotation of the water wheel in casing 5 the beating elements 19 and 24 will be rotated in opposite directions, thus beating any material placed in vessel 14. The action of the beating members will thus be caused to be uniform and rapid, thus conducing to efficiency in use. The specific form and arrangement of parts is a simple and efficient one for the purpose.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention what I claim as new and desire to secure by Letters Patent is:

1. A device of the class described comprising a casing, a shaft mounted in said casing and having one end projecting below the bottom thereof, means in said casing for rotating said shaft, a base for said casing arranged to fit over the top of a vessel, a U-shaped frame having one end fixed to said casing and the other end swiveled to the end of said shaft, and beating elements mounted in said frame and operatively connected to said shaft, substantially as described.

2. A device of the class described comprising a casing, a shaft mounted in said casing and having one end projecting below the bottom thereof, means in said casing for rotating said shaft, a base for said casing arranged to fit over the top of a vessel, a U-shaped frame having one end fixed to said casing and the other end swiveled to the end of said shaft, and a pair of beating elements mounted upon the respective legs of said frame, one of said elements being connected to said shaft and the other element being operatively geared thereto, substantially as described.

In testimony whereof I have signed my name to this specification in the presence of two subscribing witnesses.

EDWARD SCHUBERT.

Witnesses:
JOSHUA R. H. POTTS,
HELEN F. LILLIS.